United States Patent [19]

Nagasu et al.

[11] Patent Number: 5,621,175
[45] Date of Patent: Apr. 15, 1997

[54] DIFFERENTIAL PRESSURE TRANSMITTER HAVING SYMMETRICAL CONSTRUCTION

[75] Inventors: Akira Nagasu; Yoshimi Yamamoto, both of Naka-machi; Tomoyuki Tobita, Katsuta, all of Japan

[73] Assignee: Hitachi, Ltd., Tokyo, Japan

[21] Appl. No.: 601,494

[22] Filed: Feb. 14, 1996

Related U.S. Application Data

[63] Continuation of Ser. No. 134,225, Oct. 8, 1993, abandoned.

[30] Foreign Application Priority Data

Oct. 22, 1992 [JP] Japan .................... 4-284169

[51] Int. Cl.⁶ .................... G01L 7/08; G01F 1/38
[52] U.S. Cl. .................... 73/706; 73/861.47
[58] Field of Search .................... 73/715, 716, 706, 73/861.42, 861.47

[56] References Cited

U.S. PATENT DOCUMENTS

| | | | |
|---|---|---|---|
| 3,999,435 | 12/1976 | Siegel | 73/716 |
| 4,135,407 | 1/1979 | Ezekiel | 73/717 |
| 4,173,149 | 11/1979 | Critten et al. | 73/716 |
| 4,466,290 | 8/1984 | Frick | 73/861.47 |
| 4,833,922 | 5/1989 | Frick et al. | 73/706 |
| 4,986,127 | 1/1991 | Shimada et al. | 73/861.61 |

FOREIGN PATENT DOCUMENTS 60-185130A 9/1985 Japan.

*Primary Examiner*—Richard Chilcot
*Assistant Examiner*—Harshad Patel
*Attorney, Agent, or Firm*—Kenyon & Kenyon

[57] ABSTRACT

A differential pressure transmitter for detecting a difference between a pressure of a first detection fluid in a first pressure-receiving chamber and a pressure of a second detection fluid in a second pressure-receiving chamber, including a first diaphragm for sealing the first detection fluid, a second diaphragm for sealing the second detection fluid which is installed almost in parallel to the first diaphragm, a first isolation chamber communicated to the first pressure-receiving chamber, a second isolation chamber communicated to the second pressure-receiving chamber, a third diaphragm installed between the first and the second chambers and in a direction different from those of the first and second diaphragms, and a differential pressure detection sensor installed on and connected to at least one of the first and the second isolation chambers. The differential pressure transmitter having a symmetrical construction has a high sensitivity because difference between transmitting coefficients in pressure transmitting paths in high and low pressures is minimized.

10 Claims, 7 Drawing Sheets

DIFFERENTIAL PRESSURE TRANSMITTER HAVING SYMMETRICAL CONSTRUCTION

This is a continuation of Ser. No. 08/134,225 filed on Oct. 8, 1993 for a Differential Pressure Transmitter having Symmetrical Construction, now abandoned.

BACKGROUND OF THE INVENTION

The present invention relates to a differential pressure transmitter having a high detection sensitivity by providing a symmetry construction of the transmitter so as to decrease a difference of the transmission coefficient between high and low pressure transmitting paths.

An example of the pressure-receiving structure of a conventional differential pressure transmitter is shown in FIG. 2 which is disclosed in Japanese Patent Laid-Open No. 60-185130(1985), in which a pressure-receiving member is constituted of two parts, body 101 in a high pressure side and body 105 in a low pressure side, and a seal diaphragm 106 is secured on one face of the body 101 and a sensor 144 and an overload protection diaphragm 104 are secured on the other face of it. In FIG. 2, the references numerals identify the element as follows;

101—High pressure side body
102—Sensor assembly
103—Center metallic part
104—Overload protection diaphragm
105—Low pressure side body
106, 107—Seal diaphragm
108, 109—Flange
110, 111—Gasket
112—Bolt
113—Nut
114—Connecting metallic part
115, 116—Isolation chamber
117, 118—Measurement fluid pressure receiving chamber
144—Semiconductor differential pressure sensor A seal diaphragm 107 is also secured on one face of the body 105 in the low pressure side, on the other face of it, the bodies 101 and 105 are so put on one another as to push the overload protection diaphragm 104 of the body 101, and the outer peripheries of them are welded.

First and second pressure-receiving chambers 117, 118 formed by seal diaphragms 106, 107 for receiving the pressures of first and second fluids are constituted on both sides of a body constituted of the bodies 101 and 105. First and second isolation chambers 115, 116 are formed by the body 101, sensor assembly 102, the overload protection diaphragm 104, and the body 105.

Moreover, the following paths are constituted: a pressure transmitting path for connecting the first pressure-receiving chamber 117 to the first isolation chamber 115, a pressure transmitting path for connecting the first isolation chamber 115 to a semiconductor differential pressure sensor, a pressure transmitting path for connecting the second pressure-receiving chamber 118 to the second isolation chamber 116, and a pressure transmitting path for connecting the second isolation chamber 116 to the semiconductor differential pressure sensor.

The first pressure-receiving chamber 117, first isolation chamber 115, semiconductor differential pressure sensor, and pressure transmitting paths for connecting them are filled with sealing liquid. Similarly, the second pressure-receiving chamber 118, second isolation chamber 116, semiconductor differential pressure sensor, and pressure transmitting paths for connecting them are also filled with sealing liquid, so that pressure is transmitted to the semiconductor differential pressure sensor.

In such a conventional differential pressure transmitter, transmitting coefficients of the respective pressure transmitting paths from the pressure-receiving chambers 117, 118 to the differential pressure sensor in high and low pressure sides were not the same because of it's unsymmetrical construction. Therefore, the transient pressure transmitted from the pressure-receiving chamber 117 or 118 is directly transmitted to the differential pressure sensor so as to give a damage to the sensor. Of course, the overload protection diaphragm 104 is provided in order to protect the sensor, but the difference between the transmitting coefficients of pressure transmitting paths connected to the overload protection diaphragm 104 in both high and low pressure sides make it impossible to perfectly protect the sensor. Therefore, it is difficult to obtain a high sensitivity differential pressure sensor.

Furthermore, U.S. Pat. No. 4,135,407 discloses a differential pressure sensor having a symmetrical construction in which a overload protection apparatus is disposed in a center position of the two pressure isolation diaphragms in high and low pressure sides.

But, the overload protection apparatus is constructed with bellows means and therefore, it is not suitable for providing the differential pressure sensor having a very high sensitivity.

SUMMARY OF THE INVENTION

The present invention has been accomplished to overcome the abovementioned problem of the conventional technique.

An object of the present invention is to provide a high sensitivity differential pressure sensor having a symmetrical construction in which both transmitting coefficients of respective pressure transmitting paths to the sensor and to an overload protection diaphragm in high and low pressure sides are almost equal to each other because of the symmetrical construction.

In order to attain the above object, the high sensitivity differential pressure sensor of the present invention has an overload protection diaphragm and a differential pressure sensor assembly which are commonly disposed between two seal diaphragms in high and low pressure sides, in which said overload protection diaphragm is disposed almost perpendicularly to both of the two seal diaphragms in high and low pressure sides.

In such a construction as above, lengths of both transmitting paths in high and low pressure sides from the seal diaphragms to the overload protection diaphragm are minimized and the length of the transmitting path in the high pressure side becomes to be equal to that in the low pressure side. At the same time, lengths of both transmitting paths in high and low pressure sides from the seal diaphragms to the differential pressure sensor assembly are minimized and become almost the same too. Therefore, differences of transmitting coefficients of the transmitting paths from the high and low pressure sides to the overload protection diaphragm and the sensor assembly are minimized. Therefore, the transient pressure transmitting to the sensor assembly is minimized so as to make it possible to provide a high sensitive differential pressure transmitter.

In a differential pressure transmitter of the present invention, furthermore, the pressure-receiving direction of a central overload protection diaphragm is different from those of first and second seal diaphragms. Therefore, the sensor assembly is easily disposed symmetrically in a central position between the seal diaphragms and simultaneously close to the overload protection diaphragm and the seal diaphragm.

DETAILED DESCRIPTION

Figure 2:
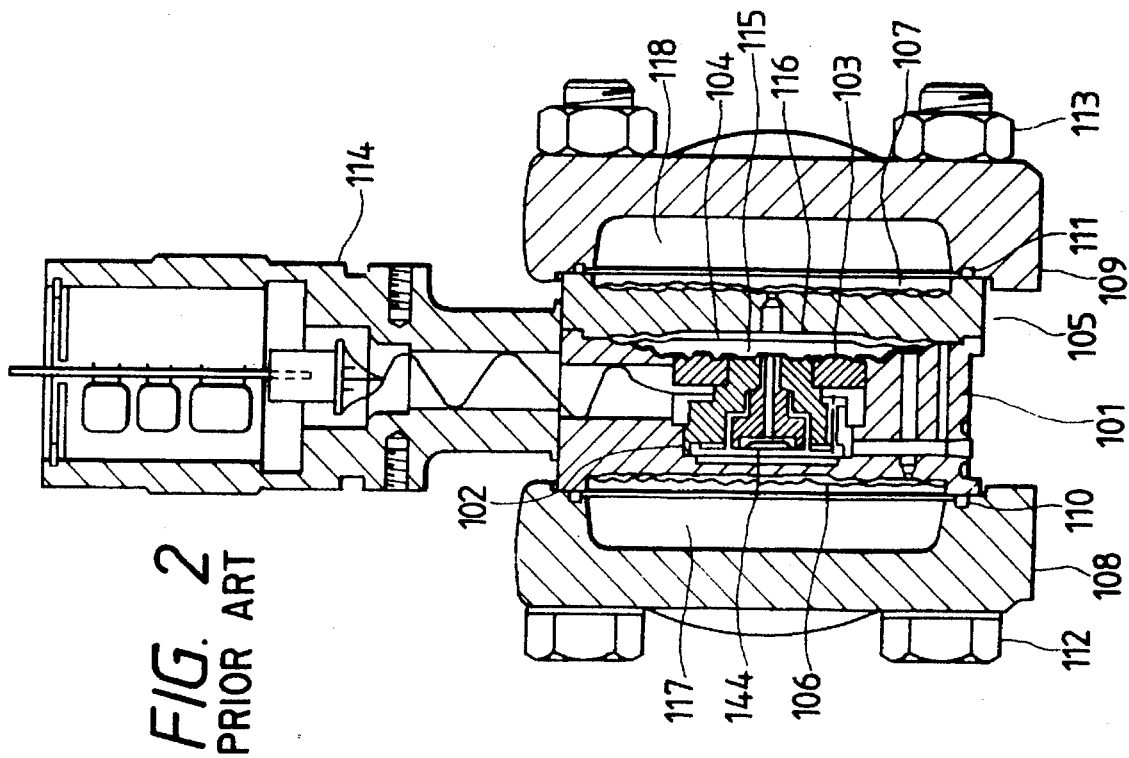
FIG. 2 is a vertical section of a conventional differential pressure transmitter.

A differential pressure transmitter of the present invention is described below referring to the drawings.

Figure 1:
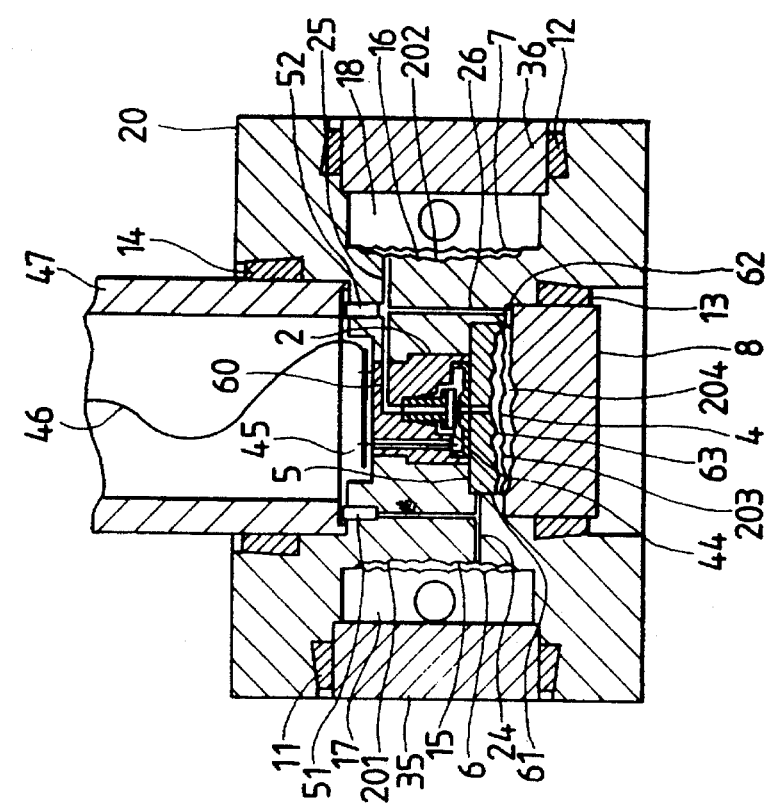
FIG. 1 is a vertical section of an embodiment of a differential pressure transmitter of the present invention.
Figure 3:
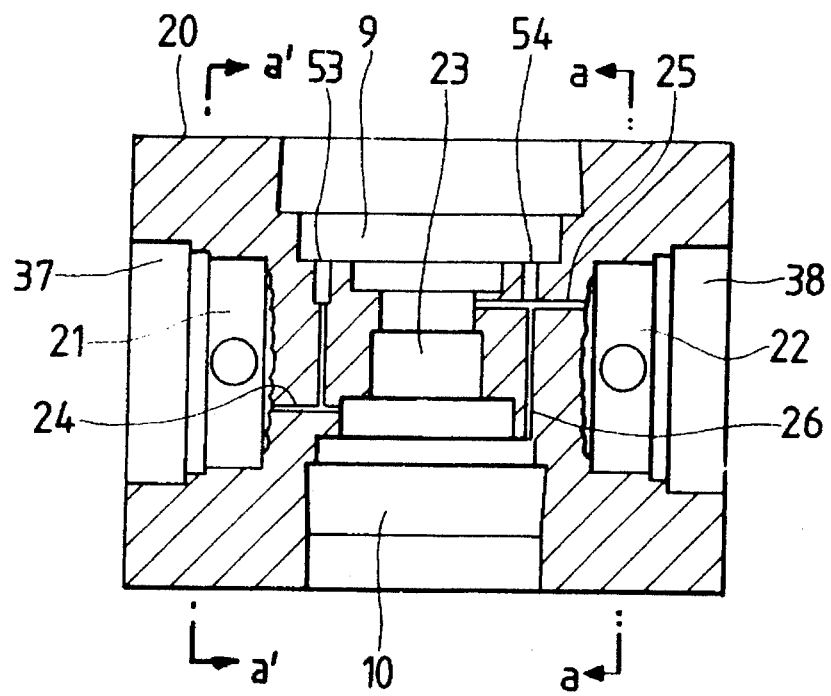
FIG. 3 is a vertical section of the pressure-receiving member of FIG. 1.

FIG. 1 shows an embodiment of a differential pressure transmitter of the present invention and FIG. 3 shows details of the pressure-receiving member 20 FIG. 1. In FIGS. 1 and 3, with the reference numerals identifying the elements as follows:

2—Sensor assembly
4—Overload protection diaphragm
5—Center metallic part
6, 7—Seal diaphragm
8—Securing metallic part
9—Amplifier setting hole
10—Securing metallic part setting hole
11, 12, 13, 14, 66, 67—Metal
15, 16—Sealing liquid
17, 18—Measurement fluid pressure receiving chamber
20—Pressure-receiving member
21, 22—Seal diaphragm setting hole
23—Sensor assembly housing hole
24, 25, 26, 31, 32, 33, 34, 60, 61, 62, 63—Pressure transmitting path
27, 28, 29, 30—Tapered screw
35, 36—Plug
37, 38—Stepped hole
39—Drain vent plug
41—Pipe
43—Adapter
44—Semiconductor differential pressure sensor
45—Hermetic seal pin
46—FPC
47—Amplifier case
48, 72, 73—Gasket
50, 75—Bolt
51, 52—Seal pin
55, 56, 57, 58—Tapered threaded plug
59—O-ring
64, 65—Tapered metallic part
68, 69—Threaded plug
70,71—Seal plate
74—Screw
76, 77—Metallic pin
78—Locknut
201—First pressure-receiving chamber
202—Second pressure-receiving chamber
203—First isolation chamber
204—Second isolation chamber The differential pressure transmitter mainly comprises a pressure-receiving member 20, sensor section assembly 2, seal diaphragms 6 and 7, overload protection diaphragm 4, first and second pressure chambers 201 and 202, and first and second isolation chambers 203 and 204.

In FIG. 3, the pressure-receiving member 20 is made up of a single member. Holes 21 and 22 for mounting the seal diaphragms 6 and 7 are symmetrically provided on both ends of the pressure-receiving member 20, the bottom of the pressure-receiving member 20 is formed into the same shape as that of the seal diaphragms 6 and 7, and stepped holes 37 and 38 with a diameter larger than that of the seal diaphragms 6 and 7 for securing plugs 35 and 36 are provided at the entrances of the holes 21 and 22.

Figure 4:
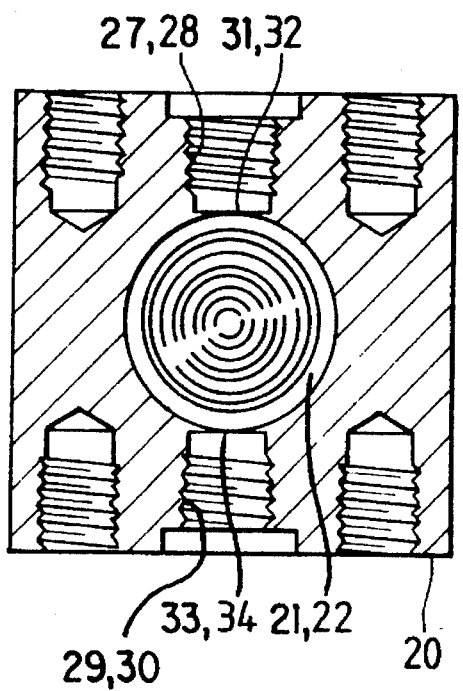
FIG. 4 is a section of the pressure-receiving member FIG. 3, taken along cutting lines a—a and a'—a' in FIG. 3.

FIG. 4 shows a sectional view of the pressure-receiving member 20 of FIG. 3, taken along line a—a of FIG. 3.

In the pressure-receiving member 20, a tapered thread 28 is formed above the hole 22 for mounting the seal diaphragm 7 and a tapered thread 30 is formed under the hole 22. They are connected to the hole 22 by connecting paths 32 and 34. Similarly, if another sectional view was taken along a comparable line with respect to hole 21 it would show tapered threads 27 and 29 formed above and under the hole 21 and connected by pressure transmitting paths 31 and 33.

On the central axis of the pressure-receiving member 20, an overload protection diaphragm 4 and a stepped hole 23 for housing the sensor section assembly 2 are provided in the direction perpendicular to the seal diaphragms 6 and 7. A hole 9 for mounting an amplifier is provided at the small diameter part of the stepped hole 23, and a securing metallic part 8 for securing the overload protection diaphragm 4 is provided at the large diameter part of the hole 23.

The seal diaphragms 6 and 7, overload protection diaphragm 4, and sensor section assembly 2 are connected by pressure transmitting paths 24, 25, and 26.

The structures of the first pressure-receiving chamber 201, second pressure-receiving chamber 202, first isolation chamber 203, and second isolation chamber 204 of an embodiment of the present invention will be described below by referring to FIG. 1.

For the differential pressure transmitter of this embodiment, the seal diaphragms 6 and 7 are built in through the holes 21 and 22 of the pressure receiving member 20 and welded so that the faces of the seal diaphragms 6 and 7 are parallel to define the first and second pressure-receiving chambers 201 and 202.

Then, the plugs 35 and 36 are built in the stepped holes 37 and 38, metals 11 and 12 are inserted into grooves formed by the plugs 35 and 36 and the stepped holes 37 and 38, and metal flow junction (plastic machining) is performed to define the measurement fluid pressure receiving chambers 17 and 18.

The sensor section assembly 2 is inserted into the center stepped hole 23 of the pressure-receiving member 20 through the large diameter part and so assembled that a pressure transmitting path 60 of the sensor section assembly 2 communicates with the pressure transmitting path 25 of the pressure-receiving member 20, and the both ends of the sensor section assembly 2 are welded to each other.

Here, the pressure transmitting path 60 may be connected to the isolation chamber directly without being connected to the pressure transmitting paths 25 and 26. In this case, both of the pressures in the pressure-receiving chambers 17, 18 are transmitted to the sensor section assembly through the isolation chambers 203, 204.

Then, a center metallic part 5 is so secured to a place that a pressure transmitting path 61 of the center metallic part 5 communicates with the pressure transmitting path 24 of the pressure-receiving member 20 and that the face having the same shape as that of the corrugated face of the overload protection diaphragm 4 is directed to the overload protection diaphragm 4. Moreover, the overload protection diaphragm 4 is welded to the pressure-receiving member 20 to define the first isolation chamber 203.

A pressure transmitting path 63 for transmitting pressure from the overload protection diaphragm 4 to a semiconductor sensor 44 is provided at the center of the center metallic part 5. A securing metallic part 8 is provided with a securing-metallic-part setting hole 10 so that a pressure transmitting path 62 of the securing metallic part 8 communicates with the pressure transmitting path 26 of the pressure-receiving member 20, and that a face having the same shape of the corrugated face of the overload protection diaphragm 4 is directed to the overload protection diaphragm 4. A metal 13 is inserted into a groove formed by the securing metallic part 8 and pressure-receiving member 20, and metal flow junction of the metallic part 8, together with the overload protection diaphragm define the second isolation chamber 204.

A space enclosed by the seal diaphragm 6, overload protection diaphragm 4, sensor section assembly 2, pressure transmitting paths 24, 61, and 63, and seal pin 51 at a liquid sealing port is filled with sealing liquid 15. Similarly, a space enclosed by the seal diaphragm 7, overload protection diaphragm 4, sensor section assembly 2, pressure transmitting paths 25, 26, 60, and 62, and seal pin 52 at a liquid sealing port is filled with sealing liquid 16.

Thereby, because the differential pressure transmitter of the present invention makes it possible to form first and second pressure-receiving chambers at places close to the overload protection diaphragm respectively, such construction makes it possible that lengths of transmitting paths 24, 61 from the first pressure-receiving chamber 201 to the overload protection diaphragm 4 and the transmitting paths 25, 26 from the second pressure-receiving chamber 202 to the overload protection diaphragm 4 are minimized and they become almost the same as each other.

At the same time, lengths of transmitting paths 24, 61, 63 from the first pressure-receiving chamber 201 to the differential pressure sensor assembly 2 and lengths of transmitting paths 25, 60 from the second pressure-receiving chamber 202 to the differential pressure sensor assembly 2 are minimized and they become almost the same too.

Therefore, both differences of transmitting coefficients of the transmitting paths from the first and second pressure-receiving chambers 201, 202 to the overload protection diaphragm 4 and to the differential pressure sensor assembly 2 are minimized, and the transient pressure transmitting to the sensor assembly is minimized so as to make it possible to provide a high sensitivity differential pressure transmitter.

In a differential pressure transmitter of the present invention as above, the pressure-receiving direction of the overload protection diaphragm 4 is different from those of first and second seal diaphragms 6, 7. Therefore, the sensor assembly is easily disposed symmetrically in a central position between the seal diaphragms and simultaneously close to the overload protection diaphragm and the seal diaphragm.

Further, because the sensor section assembly 2 has the semiconductor sensor 44 and a hermetic seal pin 45, it is unnecessary to provide a hole for generating a sensor signal in the pressure-receiving member 20 by soldering an FPC 46 to the atmospheric pressure releasing side of the hermetic pin 45 though the hole is necessary in conventional differential pressure transmitters.

An amplifier case 47 is inserted into the hole 9 and a metal 14 is inserted into a groove defined by the pressure-receiving member 20 and amplifier case 47 to secure the amplifier case 47 to the pressure-receiving member 20 by metal flow junction.

The operation of a differential pressure transmitter of the above constitution will be described below referring to FIG. 1.

When a first pressure of the process fluid is applied to the seal diaphragm 6, the first pressure of the measurement fluid is transmitted to the sealing liquid 15 in the first pressure-receiving chamber 201 at the back of the seal diaphragm 6. Moreover, the first pressure is transmitted to the first isolation chamber 203 defined between the overload protection diaphragm 4 and center metallic part 5 through the pressure transmitting paths 24 and 61 and further transmitted to the semiconductor sensor 44 through the pressure transmitting path 63 of the center metallic part 5. Further, when a second pressure of the process fluid is applied to the seal diaphragm 7, the second pressure of the measurement fluid is transmitted to the sealing liquid 16 in the second pressure-receiving chamber 202 through the seal diaphragm 7 and further transmitted to the second isolation chamber 204 between the overload protection diaphragm 4 and securing metallic part 8 through the pressure transmitting paths 25 and 26 and to the back of a sensor through the pressure transmitting path 60. Thus, the semiconductor sensor 44 detects the first and second pressures of the measurement fluid transmitted to the front and back of the overload protection diaphragm, the output of the semiconductor sensor 44 is taken out to the atmosphere releasing side from hermetic seal pin 45 and transmitted to an amplifier through the FPC 46.

Figure 13:
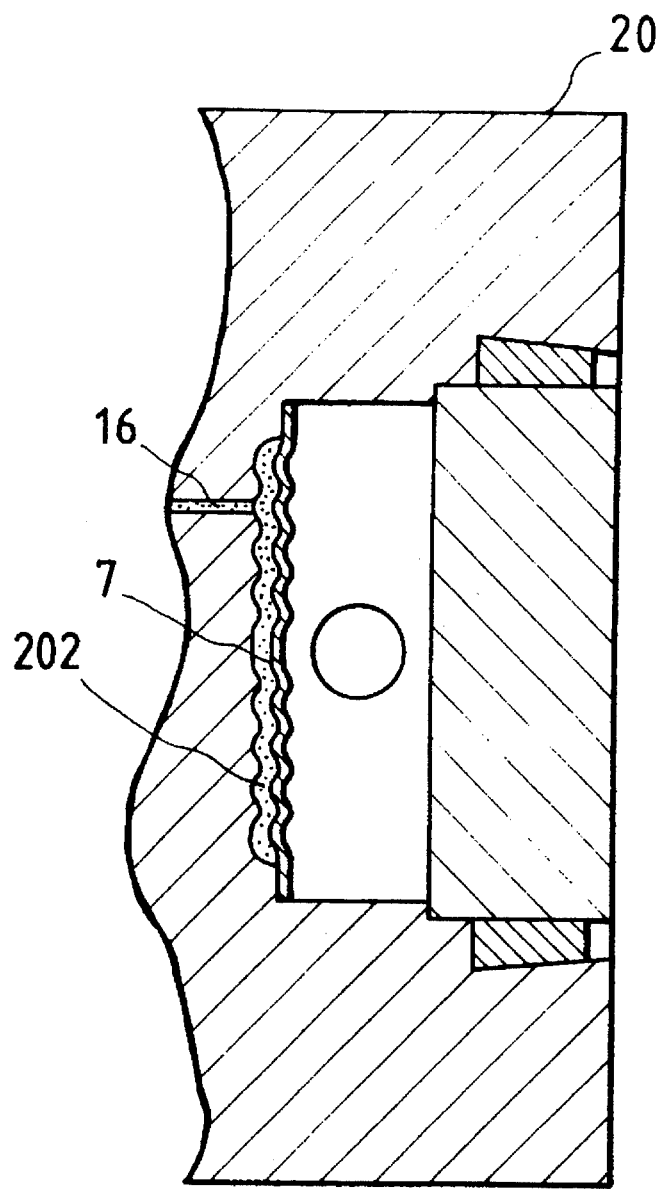
FIG. 13 is a partial section of the embodiment shown in FIG. 1.

The overload protection diaphragm 4 is provided in order to protect the semiconductor sensor 44 when an overload pressure is added to the seal diaphragm 6 or 7. As shown in FIG. 13, the seal diaphragm 7 is put on the pressure-receiving member 20 which is formed so as to have a same shape as the seal diaphragm 7 and stops to increase inner pressure of the sealing liquid 16 when the seal diaphragm receives the overload pressure.

The measurement fluid pressure receiving chambers 17 and 18 are provided in the pressure-receiving member 20, flanges, and bolts and nuts are not particularly needed unlike conventional differential pressure transmitter. That is, it is only necessary to use the plugs 35 and 36 in order to define the measurement fluid pressure receiving chambers 17 and 18. To secure the plugs 35 and 36, the metals 11 and 12 are plastically deformed to ensure the airtightness and strength. The metals 11 and 12 are of metallic materials softer than the pressure-receiving member 20.

Figure 5:
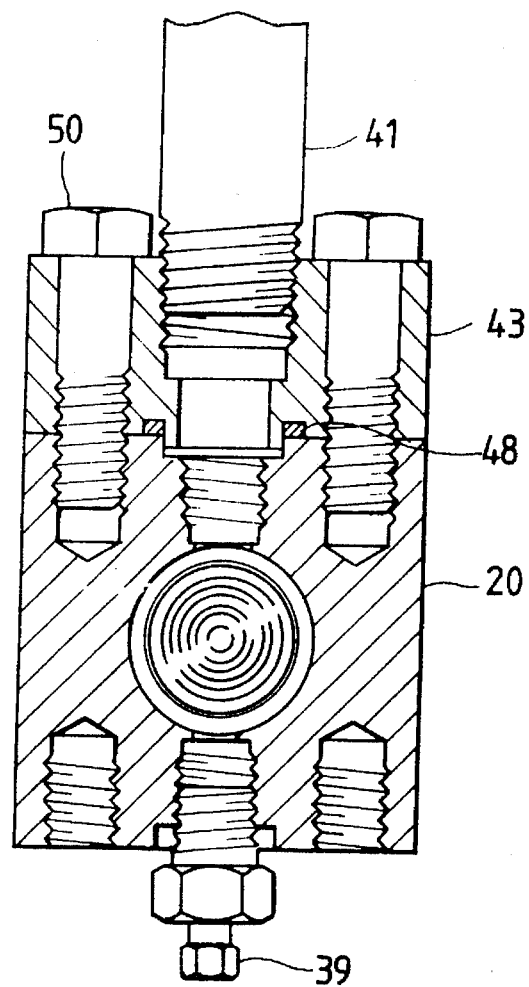
FIG. 5 is a section of a piping example of a differential pressure transmitter of the present invention.

A process pipe 41 is connected by means of an adapter 43 and gasket 48 secured to one of connection ports of the pressure-receiving member 20 by a bolts 50 as shown in FIG. 5. The pipe 41 is screwed into the adapter 43. A drain vent plug 39 is connected to the other connection port. The connection of the process pipe 41 and the drain vent plug 39 can be made on both the top and bottom or perpendicularly. In FIG. 5, the pipe 41 is connected to the pressure-receiving member 20 through the adapter 43. However, it is also possible to connect the pipe 41 directly to the pressure-receiving member 20 by providing a tapered thread in the pressure-receiving member 20.

Furthermore, in the differential pressure transmitter of the present invention, the pressure-receiving member 20 can be a single part because the measurement fluid pressure receiving chambers 17 and 18 can be defined in the pressure-receiving member 20. Therefore, no flange, bolt, or nut is necessary to define the measurement fluid pressure receiving chambers 17 and 18. Thus, changes of zero point and support are eliminated and a differential pressure can be more accurately measured because the pressure-receiving member 20 is not deformed due to the fastening of bolts and nuts and the pressure-receiving member body is not deformed even if an uneven pressure or excessive static pressure is applied to the measurement fluid pressure receiving chambers 17 and 18.

Furthermore, by shaping a metal inserting groove into a reverse taper (reverse wedge), the airtightness and strength are further improved, the reliability is improved, and this differential pressure transmitter can be used even in the case of very high pressure.

Figure 6:
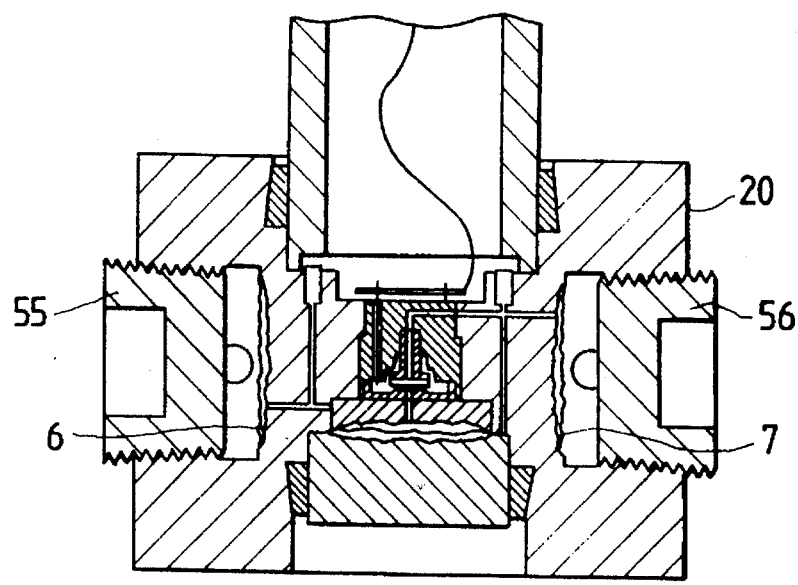
FIG. 6 is a section of an embodiment of the present invention in which threaded plugs are secured in the openings.
Figure 7:
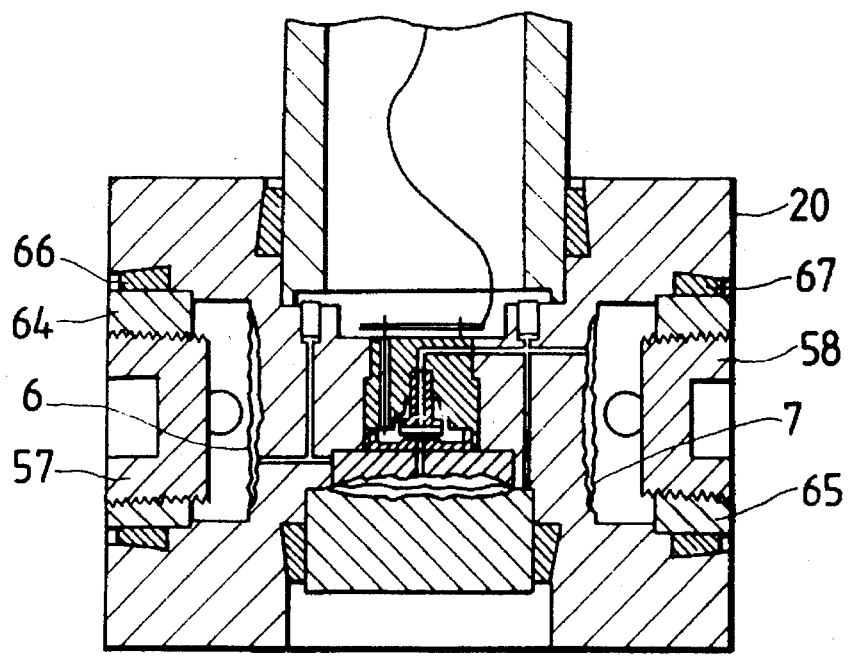
FIG. 7 is a section of another embodiment of the present invention in which threaded plugs are secured in the openings.
Figure 8:
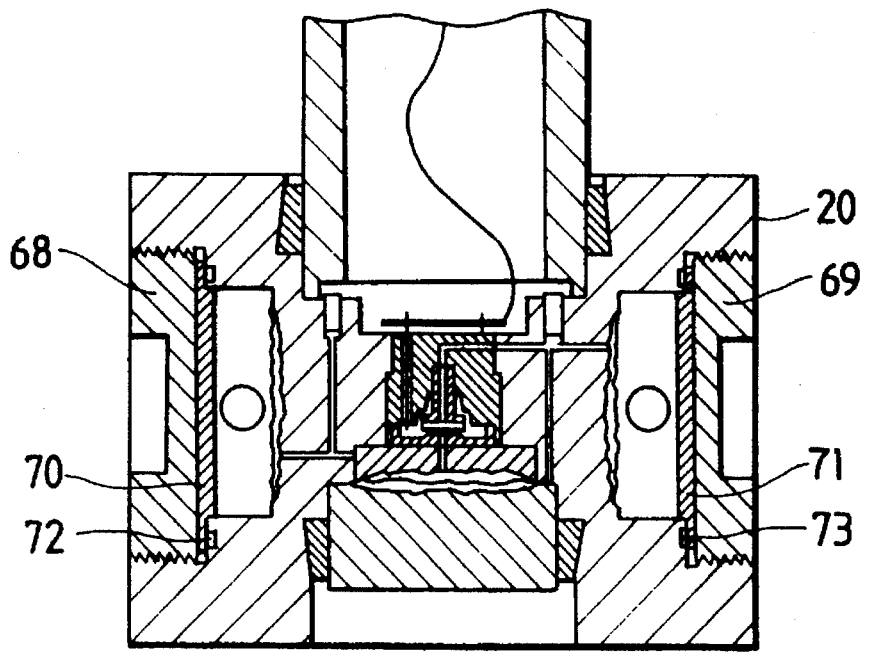
FIG. 8 is a section of another embodiment of the present invention of how the threaded plugs are secured in the openings.

FIGS. 6 to 8 show modifications of setting the plugs.

FIG. 6 shows a structure in which the outer periphery of the plugs are taper-threaded with a diameter larger than that of the seal diaphragms 6 and 7 and screwed into the pressure-receiving member 20, so that the tapered threaded plug 55 and 56 can be removed to check the seal diaphragms 6 and 7.

FIG. 7 shows a structure in which the thread diameter is smaller than the seal diaphragms 6 and 7 considering the fastening of tapered plugs. Tapered metallic parts 64 and 65 for holding tapered threaded plugs 57 and 58 are secured through metals 66 and 67 by metal flow.

FIG. 8 shows a structure in which plugs are parallel-threaded and these threaded plugs 68 and 69 are screwed into the pressure-receiving member 20 and sealed by gaskets 72 and 73 through seal plates 70 and 71. Thereby, the maintainability is improved.

Figure 9:
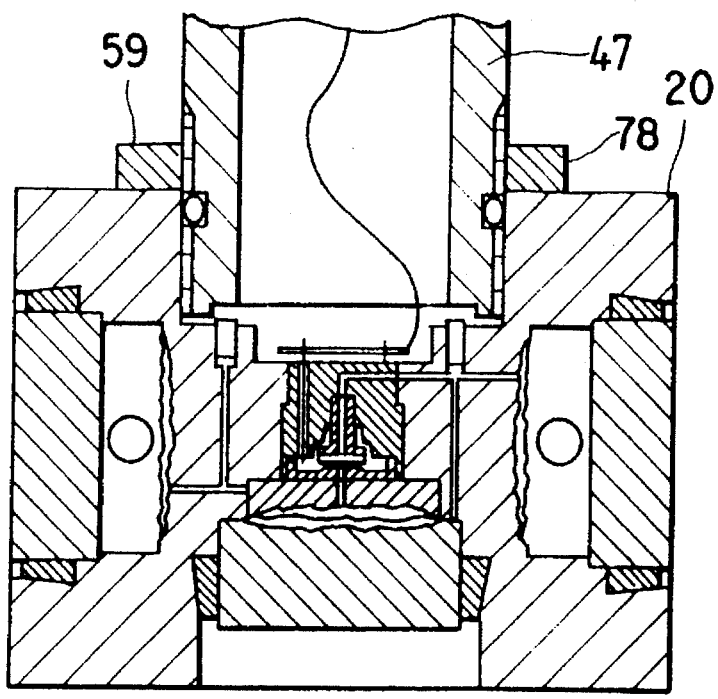
FIG. 9 is a section of an embodiment of the present invention of how an amplifier is secured.
Figure 10:
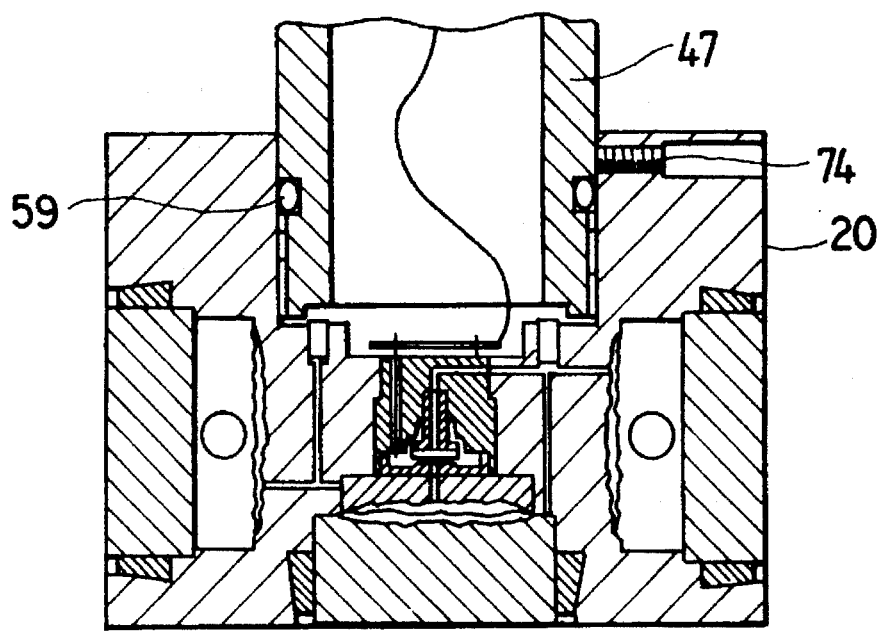
FIG. 10 is a section of another embodiment of the present invention of how an amplifier is secured.
Figure 11:
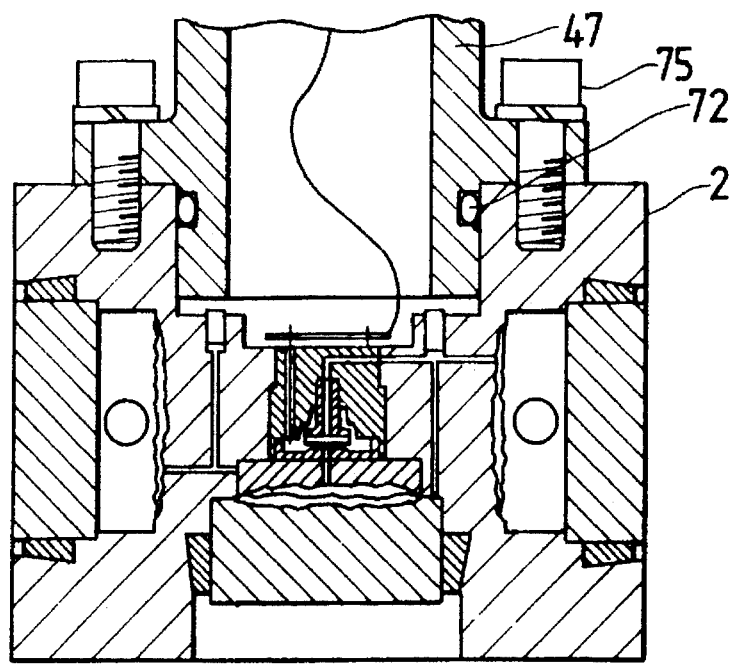
FIG. 11 is a section of still another embodiment of the present invention of how an amplifier is secured.

FIGS. 9 to 11 show modifications of the method for connecting the pressure-receiving member 20 to the amplifier case 47.

FIG. 9 shows a structure in which the amplifier case 47 is screwed into the pressure-receiving member 20, sealed with an O-ring 59, and secured with a locknut 78. The structure is effective to remove the amplifier case 47 and secure it in any direction.

The structure of FIG. 10 is the same as that of FIG. 9, in which a screw 74 is used for locking and a pressure-receiving member can be easily secured in any direction.

FIG. 11 shows a structure in which a flange is provided on the amplifier case 47 and the flange is secured to the pressure-receiving member 20 with bolts 75. The structure is effective when setting a differential pressure transmitter is installed in a place subject to strong vibrations.

Figure 12:
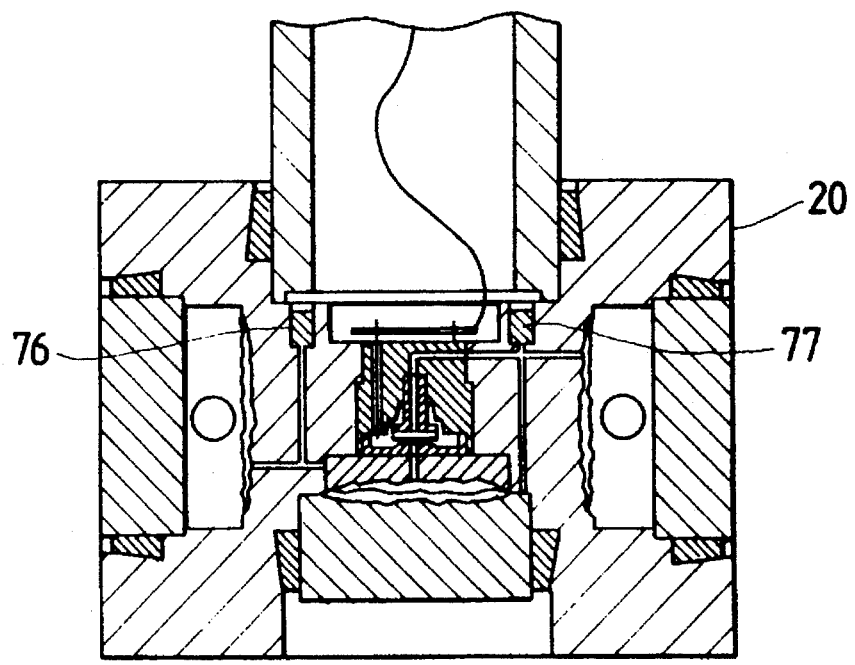
FIG. 12 is a section of still another embodiment of the present invention of how an amplifier is secured.

FIG. 12 shows a modification of the method for sealing the seal pins 51 and 52 of FIG. 1, in which metallic pins 76 and 77 made of copper or the like are inserted into holes to seal them through metal flow in order to improve the assembling efficiency.

What is claimed is:

1. A differential pressure transmitter for detecting a difference between a pressure of a first detection fluid in a first pressure-receiving chamber and a pressure of a second detection fluid in a second pressure-receiving chamber, comprising a first diaphragm for sealing the first detection fluid in the first pressure-receiving chamber, a second diaphragm for sealing the second detection fluid in the second pressure-receiving chamber which is installed substantially parallel to the first diaphragm, a first isolation chamber communicating with the first pressure-receiving chamber, a second isolation chamber communicating with the second pressure-receiving chamber, a third diaphragm installed between the first and the second isolation chambers so as to seal them separately and disposed at a different angle from those of the first and second diaphragms, between the first and second diaphragms, a differential pressure detection sensor installed on and communicated to the first and the second isolation chambers; and a pressure receiving member formed of a single member and being provided with plural threads connected to pressure transmitting paths from a process, and seal diaphragm setting holes in which the first diaphragm, the second diaphragm and the third diaphragm are respectively installed, said threads respectively connected to the first diaphragm and the second diaphragm through respective transmitting paths that are formed in the pressure receiving member.

2. A differential pressure transmitter as defined in claim 1, wherein the differential pressure detection sensor and the third diaphragm are disposed in center of the first and the second diaphragms.

3. A differential pressure transmitter as defined in claim 1, wherein pressure-receiving angles of the first and the second diaphragm are on a same axis.

4. A differential pressure transmitter as defined in claim 1, wherein pressure-receiving angle of the first and the second diaphragm are at a different angle than a pressure-receiving angle of the third diaphragm.

5. A differential pressure transmitter as defined in claim 1, wherein pressure-receiving angles of the first and the second diaphragm are substantially perpendicular to a direction of a pressure-receiving direction of the third diaphragm.

6. A differential pressure transmitter as defined in claim 1, further comprising a first pressure transmitting path connected from the first-pressure receiving chamber to the differential pressure detection sensor and having a first transmitting coefficient, and a second pressure transmitting path connected from the second-pressure receiving chamber to the differential pressure detection sensor and having a second transmitting coefficient, wherein said first transmitting coefficient is substantially equal to said second transmitting coefficient.

7. A differential pressure transmitter as defined in claim 1, further comprising a third pressure transmitting path connected from the first-pressure receiving chamber to the first isolation chamber and having a third transmitting coefficient, and a fourth pressure transmitting path connected from the second-pressure receiving chamber to the second isolation chamber and having a fourth transmitting coefficient, wherein said third transmitting coefficient is substantially equal to said fourth transmitting coefficient.

8. A differential pressure transmitter as defined in claim 1, further comprising a first pressure transmitting path connected from the first-pressure receiving chamber to the differential pressure detection sensor and having a first transmitting coefficient, a second pressure transmitting path connected from the second-pressure receiving chamber to the differential pressure detection sensor and having a second transmitting coefficient, a third pressure transmitting path connected from the first-pressure receiving chamber to the first isolation chamber and having a third transmitting coefficient, and a fourth pressure transmitting path connected from the second-pressure receiving chamber to the second isolation chamber and having a fourth transmitting coefficient, wherein said first transmitting coefficient is substantially equal to said second transmitting coefficient and said third transmitting coefficient is substantially equal to said fourth transmitting coefficient.

9. A differential pressure transmitter as defined in claim 1, wherein the differential pressure detecting sensor is held by a sensor assembly and said pressure receiving member has a hole for joining the sensor assembly therein, diameter of said hole decreasing stepwise according to the position to the outside of the hole so as to firmly install the sensor assembly in the hole.

10. A differential pressure transmitter as defined in claim 1, wherein:

the first, second, and third diaphragms are connected to the pressure-receiving member of the differential pressure transmitter using a metal flow method by plasticity deformation processing.

\* \* \* \* \*

UNITED STATES PATENT AND TRADEMARK OFFICE
CERTIFICATE OF CORRECTION

PATENT NO. : 5,621,175
DATED : April 15, 1997
INVENTOR(S) : Akira NAGASU et al.

It is certified that error appears in the above-identified patent and that said Letters Patent is hereby corrected as shown below:

| Column | Line | |
|---|---|---|
| 3 | 62 | Delete "66, 67". |

Signed and Sealed this

Seventeenth Day of February, 1998

Attest:

BRUCE LEHMAN

Attesting Officer    Commissioner of Patents and Trademarks